I. T. WHITTON.
PRESERVATIVE RECEPTACLE.
APPLICATION FILED MAR. 1, 1913.
1,088,194.
Patented Feb. 24, 1914.
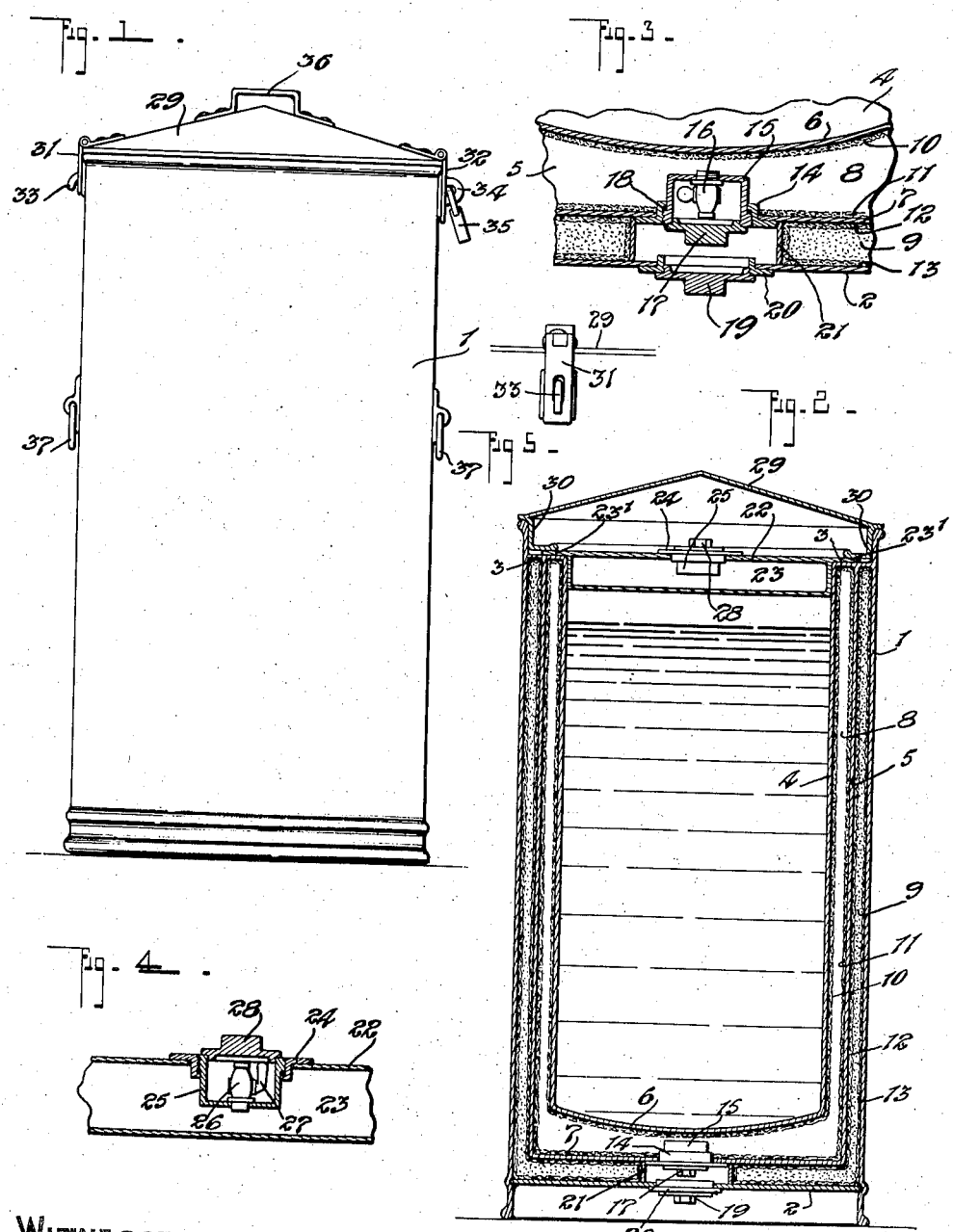

UNITED STATES PATENT OFFICE.

IRA TOTTON WHITTON, OF WINNIPEG, MANITOBA, CANADA.

PRESERVATIVE RECEPTACLE.

1,088,194. Specification of Letters Patent. Patented Feb. 24, 1914.

Application filed March 1, 1913. Serial No. 751,634.

*To all whom it may concern:*

Be it known that I, IRA TOTTON WHITTON, of the city of Winnipeg, in the Province of Manitoba, Canada, have invented certain new and useful Improvements in Preservative Receptacles, of which the following is the specification.

The invention relates to a receptacle for the reception of various perishable commodities the present device being particularly adaptable for preserving milk or cream from the producer to the consumer.

The object of the invention is to provide a durable inexpensive and efficient receptacle which will preserve the produce or material placed therein for a considerable period and it consists essentially in the arrangement and construction of parts hereinafter more particularly described and later pointed out in the appended claim.

Figure 1 represents a side view of the complete receptacle. Fig. 2 is a vertical sectional view centrally through the same. Fig. 3 is an enlarged detailed vertical sectional view through a portion of the bottom of the receptacle. Fig. 4 represents an enlarged detailed vertical sectional view through a portion of the top of the receptacle. Fig. 5 represents a side view of one of the hasps carried by the outer lid.

In the drawing like characters of reference indicate corresponding parts in each figure.

1 represents an outer cylindrical casing provided with a suitable bottom 2 and having the top provided with an inwardly directed flange 3 which flange carries an inner cylindrical casing 4 and an intermediate cylindrical casing 5 both of which are supplied with closed bottoms 6 and 7 respectively. The casings 1, 4 and 5 are spaced apart, the space between the inner and intermediate casings forming a vacuum chamber 8 while the space between the intermediate and outer casing provides a space for a heat insulating material 9 such as mineral wool. The opposing walls of the vacuum chamber are lined with an asbestos sheeting 10 and 11, the sheetings being placed on the outer face of the inner casing and the inner face of the intermediate casing. The outer wall of the intermediate casing and the inner wall of the outer casing are also fitted with asbestos linings 12 and 13. These linings of asbestos extend also on the bottoms of the casings as will be apparent from Figs. 2 and 3 of the drawing. The above parts constitute what might be called in general terms the body of the receptacle.

14 is a screw threaded socket located centrally in the bottom 7 of the intermediate casing which socket receives a threaded valve casing 15 which threads into the socket and extends into the vacuum chamber 8 reserved between the inner and intermediate casings. The casing incloses a two-way valve 16 which when open allows the air to be withdrawn from the chamber 8. I have not considered it necessary to enter into the details of the valve as any suitable form could be used. The valve casing is closed by a screw plug 17. A packing strip 18 is inserted between a flange provided on the socket and a flange on the valve casing and it will be noticed that these parts are provided with threads. This packing strip insures an air tight joint when once the casing is screwed tightly into the socket.

19 is a screw plug threaded into a socket 20 located in the bottom 2 of the outer casing directly opposite the socket 14 already referred to. This screw plug, when removed allows one to have access to the inner screw plug and the valve. A partition 21 extends between the bottoms 2 and 7 of the casing and adjoining the sockets the purpose of which will be apparent.

22 represents an inner cover for the receptacle, which cover is provided with a vacuum chamber 23 and has an extending flange 23' which rests normally on top of the flange 3 already referred to. The cover carries an interiorly screw threaded socket 24 which receives a valve casing 25, the casing being screw threaded into the socket and extending into the vacuum chamber 23.

26 is a two-way valve located in the casings and opening to the interior of the chamber 23. The valve is supplied with an extending lever 27 so that it can be manipulated readily to allow or stop the passage of air as the case may be. I might here explain that the valve 16 is of the same form as the valve 26.

28 is a screw plug threaded into the valve casing and inclosing the valve.

29 is an outer cover for the receptacle which is provided with an inwardly turned L-shaped flange 30 which plugs into the upper end of the outer casing and rides on the flange 23' on the inner cover.

31 and 32 are similar slotted hasps carried by the outer cover at opposite sides thereof. The outer casing is fitted at one side with a permanent hook 33 and at the other side with a staple 34 the hook and staple being designed to receive the hasps when the said hasps are thrown down.

35 represents a padlock passing through the staples and locking the top cover to the casing.

36 is a handle secured to the top cover and 37 are handles located at opposite sides of the outer casing.

The vacuum chambers 8 and 23 are formed by removing the screw plugs and attaching a vacuum pump in turn to the valves. When the air has been exhausted from the chambers the valves are closed, the pump is removed and the screw plugs are readjusted.

When one desires to place material in the receptacle he undoes the lock 35, swings open the hasp 32 and then raises the lid 29, the hasp 31 forming a pivot for the lid. He then removes the inner lid which allows him to place the material in the inner casing and it will be noticed that the inwardly directed portion of the flange 30 forms a lock for the inner lid when once the outer lid is fastened.

What I claim as my invention is;

The combination comprising an outer casing provided with a suitable closed bottom and having an inwardly directed flange toward the top, an inner casing suspended from the flange and contained within the outer casing, said inner casing being supplied also with a closed bottom, an intermediate casing interposed between and spaced from the inner and outer casings, said intermediate casing being also carried by the flange and provided with a closed bottom, heat insulating material interposed between the intermediate and outer casing, a suitably inclosed valve carried by the bottom of the intermediate casing and opening to the space reserved between the inner and intermediate casing, a screw plug opposite the valve and carried by the bottom of the outer casing, an inner cover fitting into the inner casing and provided with an extending flange resting on the flange aforesaid, said cover being formed with a hollow interior, a suitably incased valve carried by the cover and opening to the interior thereof and an outer cover provided with an inturned L-shaped flange plugging into the upper end of the outer casing and bearing normally on the upper face of the flange of the inner cover, as and for the purpose specified.

Signed at Winnipeg this 28 day of January 1913.

IRA TOTTON WHITTON.

In the presence of—
G. S. ROXBURGH,
L. GOULD.